US008116482B2

(12) United States Patent
Cerwin et al.

(10) Patent No.: US 8,116,482 B2
(45) Date of Patent: Feb. 14, 2012

(54) LOW NOISE MICROPHONE FOR USE IN WINDY ENVIRONMENTS AND/OR IN THE PRESENCE OF ENGINE NOISE

(75) Inventors: Stephen Anthony Cerwin, Mico, TX (US); Martin Gray Dennis, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1204 days.

(21) Appl. No.: 11/846,235

(22) Filed: Aug. 28, 2007

(65) Prior Publication Data

US 2008/0212819 A1 Sep. 4, 2008

Related U.S. Application Data

(60) Provisional application No. 60/840,654, filed on Aug. 28, 2006.

(51) Int. Cl.
*H04B 15/00* (2006.01)
*H04B 15/06* (2006.01)
*G10K 11/00* (2006.01)

(52) U.S. Cl. ....... 381/94.7; 381/71.1; 381/92; 381/94.1; 381/359; 181/206; 181/210

(58) Field of Classification Search .................. 181/206, 181/210; 381/71.1–71.14, 73.1, 92, 94.4, 381/94.7, 98, 160, 163, 359
See application file for complete search history.

(56) References Cited

U.S. PATENT DOCUMENTS

| | | | | |
|---|---|---|---|---|
| 4,039,999 | A | 8/1977 | Weston | 340/5 T |
| 5,812,678 | A | 9/1998 | Scalise et al. | 381/67 |
| 6,122,384 | A | 9/2000 | Mauro | 381/94.3 |
| 7,127,076 | B2 | 10/2006 | Roeck et al. | 381/312 |
| 2005/0207590 | A1 | 9/2005 | Niehoff et al. | 381/77 |
| 2007/0195968 | A1 * | 8/2007 | Jaber | 381/71.11 |
| 2011/0129101 | A1 * | 6/2011 | Hooley | 381/92 |

FOREIGN PATENT DOCUMENTS

| | | |
|---|---|---|
| WO | 02/089525 | 11/2002 |
| WO | 03/019125 | 3/2003 |

* cited by examiner

*Primary Examiner* — Michelle Mandala
*Assistant Examiner* — Raj R Gupta
(74) *Attorney, Agent, or Firm* — Chowdhury & Georgakis, P C; Ann C Livingston

(57) ABSTRACT

A microphone for use in windy environments. The microphone uses a transducer to flood the environment outside the microphone with a high frequency (such as an ultrasonic) acoustic field. The sounds desired to be detected are mixed with the high frequency carrier, and can then be received by the microphone with less wind noise. The microphone then demodulates the desired sound signals from the high frequency carrier. The microphone can be configured in a special emitter-receiver configuration that also reduces interference from engine noise.

8 Claims, 9 Drawing Sheets

LOW NOISE MICROPHONE FOR USE IN WINDY ENVIRONMENTS AND/OR IN THE PRESENCE OF ENGINE NOISE

RELATED PATENT APPLICATION

This application claims the benefit of U.S. Provisional Application No. 60/840,654, filed Aug. 28, 2006 and entitled "LOW NOISE MICROPHONE FOR USE IN WINDY ENVIRONMENTS."

TECHNICAL FIELD OF THE INVENTION

This invention relates to detecting acoustic signals, and more particularly to detecting low frequency acoustic signals in the presence of wind and/or engine noise.

BACKGROUND OF THE INVENTION

One problem with microphones used in the outdoors is wind noise. For example, when microphones are flown on airborne vehicles for the purpose of airborne acoustic data collection, wind noise limits sensitivity and reception in the desired frequency range. In particular, the observed wind noise exhibits a 1/f characteristic with frequency and a $V^2$ characteristic with velocity.

An airborne platform for remote acoustic data collection poses an additional challenge to practical implementation, which is interference from engine noise, if data is to be collected when the aircraft is operating with an engine on. The amplitudes of engine sounds can be many times greater than those of the desired signals, placing severe constraints on microphone dynamic range and sensitivity.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to several embodiments of microphone systems capable of good operational performance under windy conditions. The microphone can be configured to also eliminate the effects of engine noise.

More specifically, for conditions of both wind and engine noise, a parametric (nonlinear) microphone described herein has spectral and directional properties that can inherently reject both wind noise and engine noise. These attributes are uniquely suited for the acquisition of airborne acoustic data from a UAV (unmanned airborne vehicle) flying at cruise speed with the engine running.

Wind Noise Reduction

Figure 1:
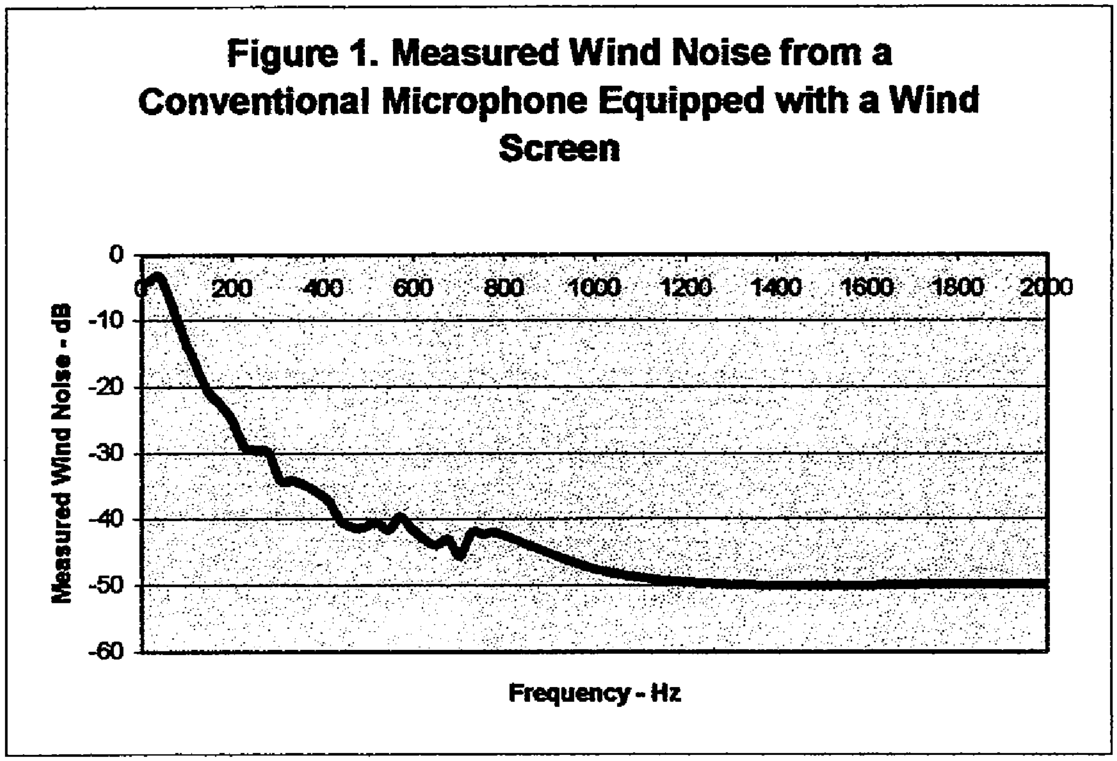
FIG. 1 illustrates typical measured wind noise for a conventional microphone equipped with a wind screen, over the frequency band from 50 Hz to 2000 Hz.

FIG. 1 illustrates typical measured wind noise for a conventional microphone equipped with a wind screen, over the frequency band from 50 Hz to 2000 Hz. The strong 1/f nature of the wind noise is evident, with the noise amplitude dramatically increasing for frequencies below 500 Hz. Unfortunately, this is the frequency range most desired for long range infrasonic collection and for collecting signature data from vehicles and machinery.

The embodiments described herein are directed to a low noise microphone for use in windy environments. Typical applications include airborne acoustic collection from aerial platforms (such as UAVs, airplanes, and balloons), wind tunnels, and outdoor terrestrial locations with high ambient wind conditions. The microphone is particularly useful for applications in which the sounds desired to be detected are low frequency sounds, such that wind noise can become a severe problem.

More specifically, the microphones reduce interference from wind noise in the low frequency part of the audio spectrum. There are two salient points regarding this type of wind noise.

The first point is that the noise is generated at the wind screen of the microphone. In the example of an airborne microphone on a UAV, if the UAV could suddenly stop its forward motion and listen at zero airspeed, there would be no wind noise. The wind noise depicted in FIG. 1 actually is generated by interaction of the wind and the microphone housing, which is typically a porous screen. More specifically, the noise results from turbulence caused by wind flow over the wind screen. The unperturbed air in front of the wind screen contains pristine audio uncontaminated by wind noise.

The second point is that the wind noise decreases rapidly with increasing frequency. In FIG. 1 for example, the wind noise is more than 40 dB less at 1500 Hz than it is at 50 Hz. The degradation of signal-to-wind noise-ratio is much more for low frequencies than for high frequencies.

The microphones described herein reduce low frequency wind noise by sensing the desired acoustic sounds in the air where the air is quiet and undisturbed, prior to generation of the wind noise by turbulence. This is accomplished by translating the desired sounds up in frequency by nonlinear mixing in air with a high frequency carrier. The air itself becomes the nonlinear element that accomplishes the frequency translation. In the case of the typical microphone having a windscreen, the mixing occurs in front of the windscreen.

Air is a compressible medium, and under high levels of acoustic excitation, the interaction of two sound waves becomes nonlinear and frequency mixing occurs. The nonlinear interaction (mixing) of the desired sounds with the high frequency carrier drives the air into nonlinear compression. The up-converted signals pass through the wind screen in the higher part of the spectrum where the wind noise is low. Demodulating the ultrasonic signals then recovers the desired signals without the wind noise.

The carrier frequency is bounded on the high side by attenuation in the air and on the low side by (1) the actual frequency content of the desired sounds, and (2) the 1/f noise caused by the microphone windscreen. For example, a typical audio of the desired sounds might extend up to 3000 Hz. Since an acoustic carrier would produce both upper and lower sidebands, the carrier frequency should be high enough so that the resulting lower sideband would not overlap the baseband signal. In this example any carrier frequency higher than 9000 Hz would do. So the lower bound for the carrier is twice the bandwidth of the baseband audio. If 1/f noise is present, the carrier frequency must also be high enough to be above it. For purposes of this description, a "high frequency carrier" is defined as a carrier meeting these criteria, and is often ultrasonic in frequency.

Figure 2:
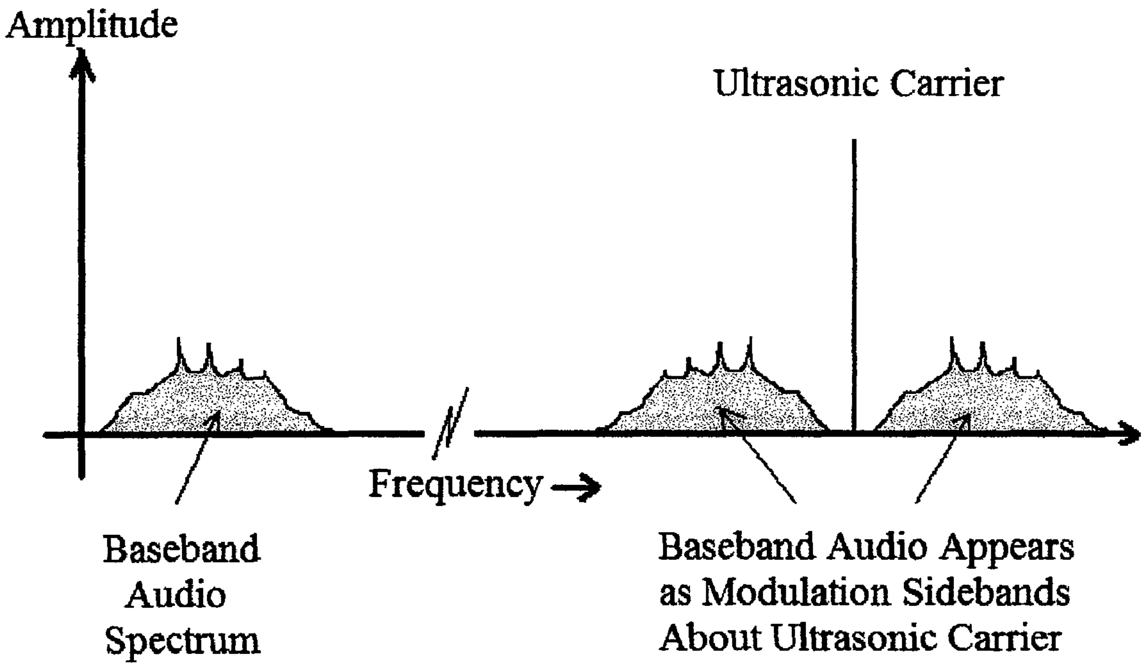
FIG. 2 illustrates the up-conversion in frequency of the base band audio to the ultrasonic range in accordance with the invention.

FIG. 2 illustrates the up-conversion in frequency of the base band audio to an ultrasonic range, that is, nonlinear mixing in the frequency domain. The nonlinear process is analogous to amplitude modulation; the modulating signal (base band audio spectrum) appears as upper and lower sidebands about the carrier frequency. The upper and lower sidebands contain identical information but are mirrored in frequency content.

Detection of the desired sounds is accomplished by passing the up-converted modulation sidebands through the wind screen in a frequency range wherein the 1/f wind noise has subsided to a low level. The sounds pass through the wind screen without the wind noise. Once the modulated spectra passes through the wind screen above the 1/f noise region, the desired sound information can be recovered through detection and various demodulation techniques. The latter may include synchronous or non-synchronous AM, DSB, or SSB demodulation techniques.

In practice, a simple way to create the microphone is to illuminate the desired sound field with an ultrasonic flood, and then sense the scattered mixed signals with an ultrasonic receiving transducer. However, the magnitude of the interaction increases with the interaction length of the two sound waves. For low frequency sound detection, constraining the physical extent of the microphone to a smaller volume is often desirable. An example is airborne acoustic collection, where several microphones disposed along the wing and fuselage of an aircraft are desired so a steerable phased array can be implemented.

Figure 3A:
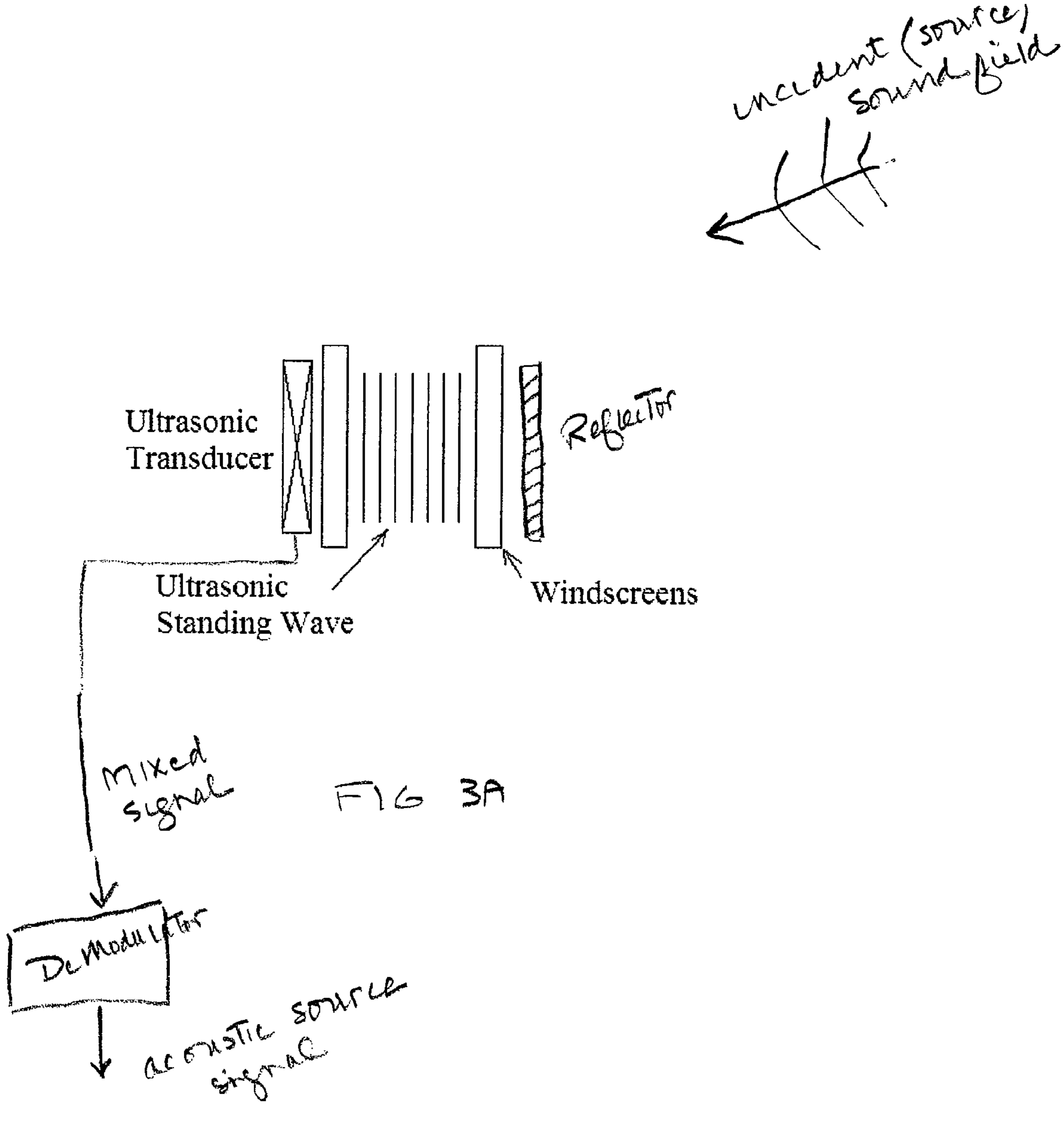
FIGS. 3A and 3B illustrate how the interaction length between the high frequency carrier and an incident sound field may be increased in a small volume.
Figure 3B:
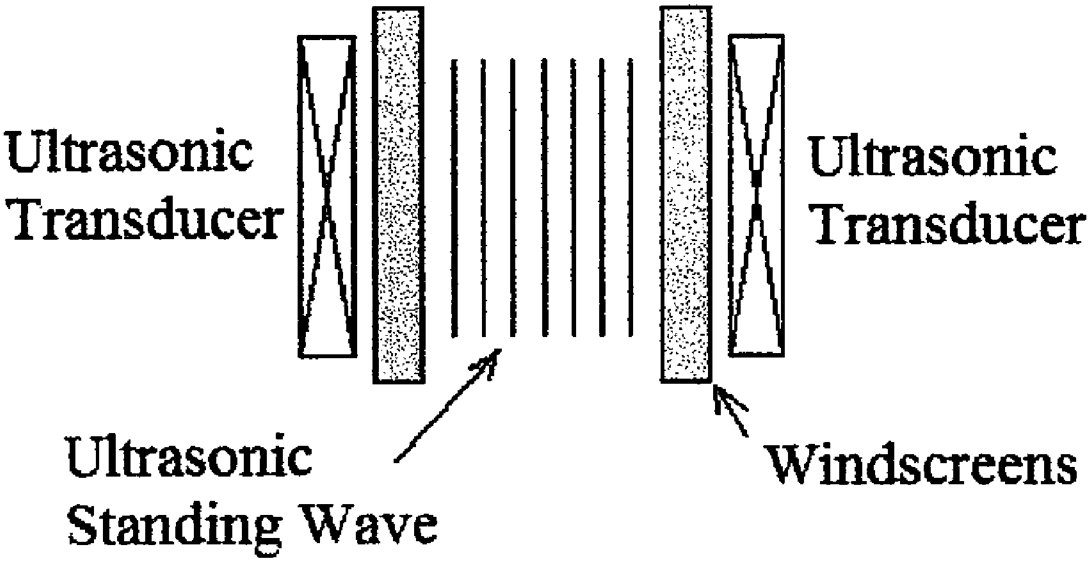

FIGS. 3A and 3B illustrate how the interaction length between the high frequency (typically ultrasonic) carrier and an incident sound field may be increased in a small volume by folding the ultrasonic sound field back on itself many times. This can be accomplished using a single transducer and a planar reflector, as illustrated in FIG. 3A, or with two parallel transducers as illustrated in FIG. 3B.

The effect is similar to an optical analog of a Fabry-Perot interferometer. The resulting standing wave can be considered as a continually reinforced reverberant beam, traversing the interaction zone in the center many times, increasing interaction length. In the two-transducer case (FIG. 3B), the transducer spacing and phasing is coordinated to produce an optimized standing wave between the two transducers. Similarly, in the case of a single transducer worked against a reflector (FIG. 3A), the drive frequency and spacing of the transducer is coordinated to reinforce a standing wave.

In the embodiment of FIG. 3B, several transmit and receive topologies are possible. One transducer could transmit and the other receive in a simple pitch-catch arrangement. Alternatively, both transducers could both transmit and receive. In this case, electronic directional couplers could be used to separate the transmit and receive signal paths. Additional topologies are possible to take advantage of angle dependencies between sound fields.

The windscreen need not be a wind screen of the conventional type. A smooth and non-porous surface for housing the "active" components of the microphone would be suitable. An "airpathless" microphone geometry would use a smooth non-porous surface backed by a cavity and the microphone components.

Figure 4:
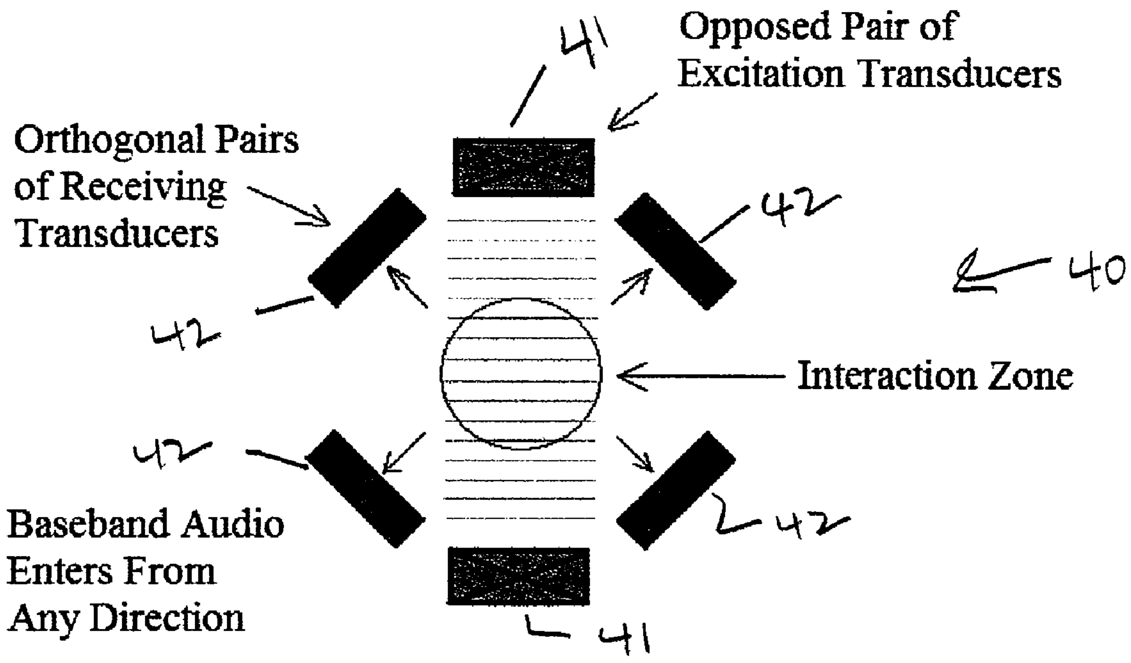
FIG. 4 illustrates an additional embodiment having a high frequency sound field generated by top and bottom transducers.

FIG. 4 illustrates shows one embodiment of a microphone array 40, in which an ultrasonic sound field is generated by an opposed pair of top and bottom transducers 41. Base band audio enters the annularly disposed array of transducers from any angle and interacts with the ultrasonic sound field in the center. The four receiving transducers 42 are arranged at right angles to each other, and pick up the scattered and up-converted sounds in crossing orthogonal paths. The orthogonal paths are useful for more advanced signal processing capabilities. The receive paths are at 45-degrees to the excitation beams, and at least one receiving transducer 42 will always be in a good position to receive forward scatter.

Figure 5:
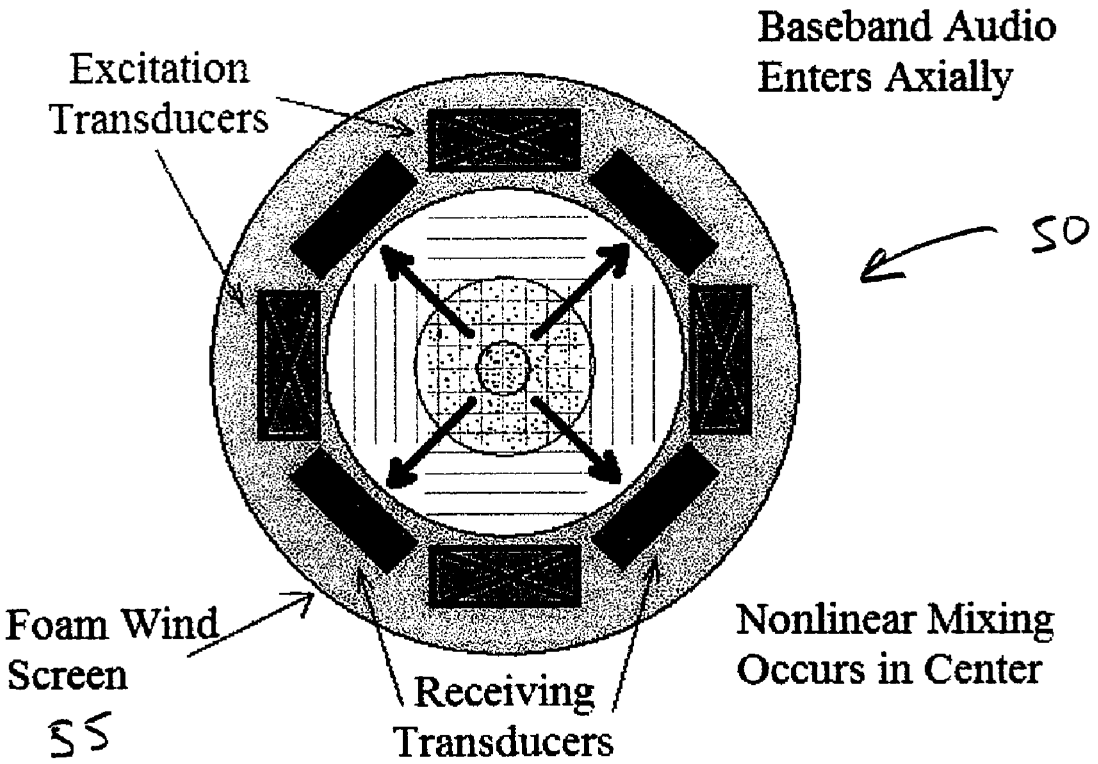
FIG. 5 illustrates an additional embodiment having orthogonal excitation and pickup paths.

FIG. 5 illustrates an annular array 50 of orthogonal excitation and receiving transducers 51. This topology is characterized by orthogonal excitation and pickup paths. Base band sounds enter the structure from any angle, including axially down the center. Also shown is an annular wind screen 55 made, for example, from acoustical foam.

A further embodiment is to include additional transducers in additional planes. This would create a 3-dimensional structure resembling a sphere. Multiple excitation transducers would be useful in generating the intense ultrasonic sound field necessary for efficient mixing, and the multiple receiving transducers would help make the microphone omnidirectional.

In sum, the above-described embodiments have the following features: 1. A means to ameliorate low frequency wind noise by sensing the desired acoustic sounds in the air in front of a wind screen prior to generation of wind induced noise at the wind screen surface. 2. A means to detect acoustic sounds in a windy environment by translating the desired low frequency sounds up in frequency by nonlinear mixing in air with an ultrasonic carrier, and then passing the up-converted signals through the wind screen in the higher part of the spectrum where the wind noise is low. Demodulating the ultrasonic signals then recovers the desired signals but without the wind noise. 3. A means to increase the interaction length between the sensed acoustic signals and the up-converting ultrasonic carrier by folding the ultrasonic path back on itself between parallel reflectors and/or transducers. 4. A means to increase the non-linear interaction between the sensed low frequency acoustic signals and the up-converting ultrasonic carrier by use of an ultrasonic standing wave. 5. A means to reduce the dependence of interaction efficiency to angle of arrival by using multiple ultrasonic carrier beams that cross at a plurality of angles.

Engine Noise Reduction

Engine noise is particularly difficult to overcome using conventional microphones, whose limitations stem primarily from their omnidirectionality and limited dynamic range. Their wide angular acceptance means that usually both noise from the desired emitter and the engine are in their field of view at the same time. Even if an adaptive noise cancellation signal could be obtained from the engine, few microphones possess the dynamic range required to separate the two signals.

The property of the proposed microphone that can be used to defeat engine noise is extreme unidirectionality. Parametric modulation occurs only when the carrier and the baseband audio signals are co-propagating and aligned within a few degrees. If an array of correctly positioned microphones is mounted on an aircraft, the engine sounds interfere only with channels pointing directly at the engine. Radial channels out to the sides largely reject the engine sounds because they cross the ultrasonic interaction length at a large angle. The dual properties of wind noise immunity and engine noise rejection could enable high quality airborne acoustic collection in powered flight at cruise speeds.

Figure 6:
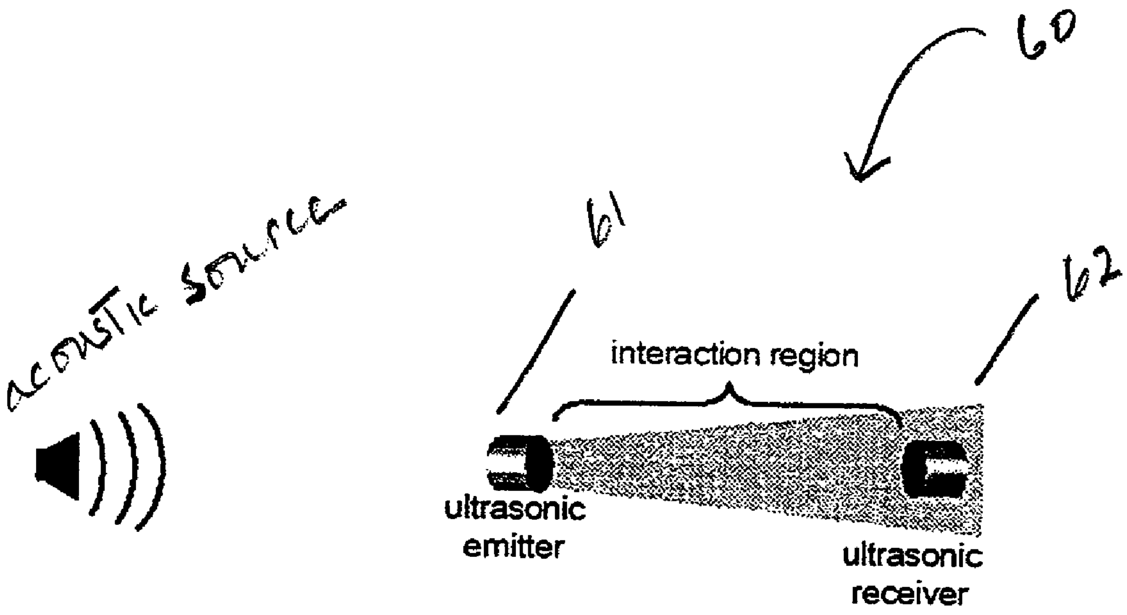
FIG. 6 illustrates the basic concept of using directionality characteristic of engine noise to reduce its effects.

FIG. 6 illustrates the basic concept of a proposed microphone, especially suited for reduction of engine noise. As explained below in connection with FIGS. 7 and 8, the microphone is an array of microphone elements; a single microphone element 60 is illustrated in FIG. 6.

An ultrasonic emitter 61 directs a narrow beam of ultrasonic energy towards an ultrasonic receiver 62. Narrow beams are easy to achieve in the ultrasound region because the wavelength is small, and emitters and receivers can have effective apertures that are several wavelengths in diameter in a small physical size.

In the pitch-catch configuration of FIG. 6, the path is completely defined by the diameters of the emitter 61 and receiver 62. Nonlinear interaction occurs when the two sound sources are co-propagating within narrow angular constraints in the same direction. This critical geometry is depicted in FIG. 6 by showing the sound source 63 inline but to the left of the ultrasonic transmitter-receiver pair.

The amplitude of the parametric mixing products between co-propagating sound waves falls off sharply as a function of angular departure from co-axial.

Experimentation indicates a 3-dB interaction angle to be less than +/− 3 degrees. Even loud sounds crossing the ultrasound path at oblique angles are virtually undetectable. It is precisely this property that can be exploited to reject high-level engine noise.

Figure 7A:
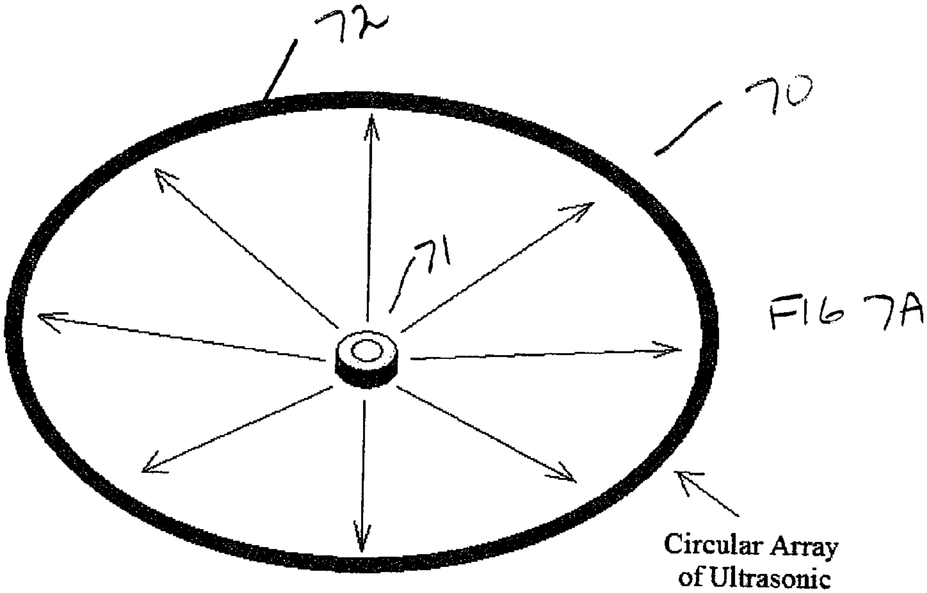
FIGS. 7A and 7B illustrate an example of a microphone designed to reduce the effects of engine noise.
Figure 7B:
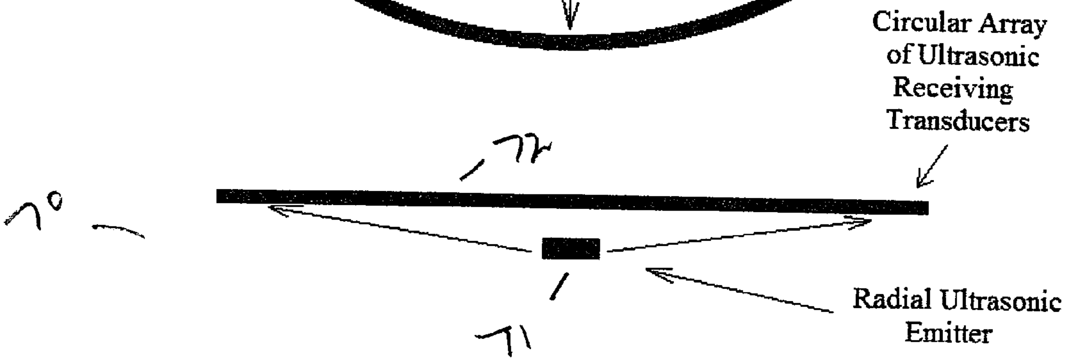

FIGS. 7A and 7B illustrate one example of a geometry for a microphone array 70, suitable for engine-on use. FIG. 7A is a perspective view; FIG. 7B is a side view. Because of the narrow interaction angle required for parametric modulation, a number of radially disposed microphones is used to obtain a large acoustic search sector.

The microphone array 70 has a radially emitting ultrasonic transmitter 71 surrounded by a circular array of ultrasonic receiving transducers 72. The radial emitter 71 is positioned below the plane of the circular array 70 to establish a down tilt in the resulting coverage area. Sounds entering coverage area from below align with a radius from the central emitter 71 to one or more receivers 72 in the annulus. The number of receivers 72 is arbitrary. An example of a suitable array 70 has 60 receivers, which provide 360 degrees of azimuth coverage assuming an acceptance angle of 6 degrees per station.

Angle-of-arrival information is deduced simply by correlation and interpolation of the receiver outputs. The down tilt angle could be adjusted by the geometry of array 70 to give the desired ground footprint for a specified cruising altitude.

In enhanced embodiments, multiple central emitters that operate on different frequencies could be stacked vertically in the center of the array. This type of configuration would add elevation resolution to sensed data for precise emitter geolocation.

Figure 8:
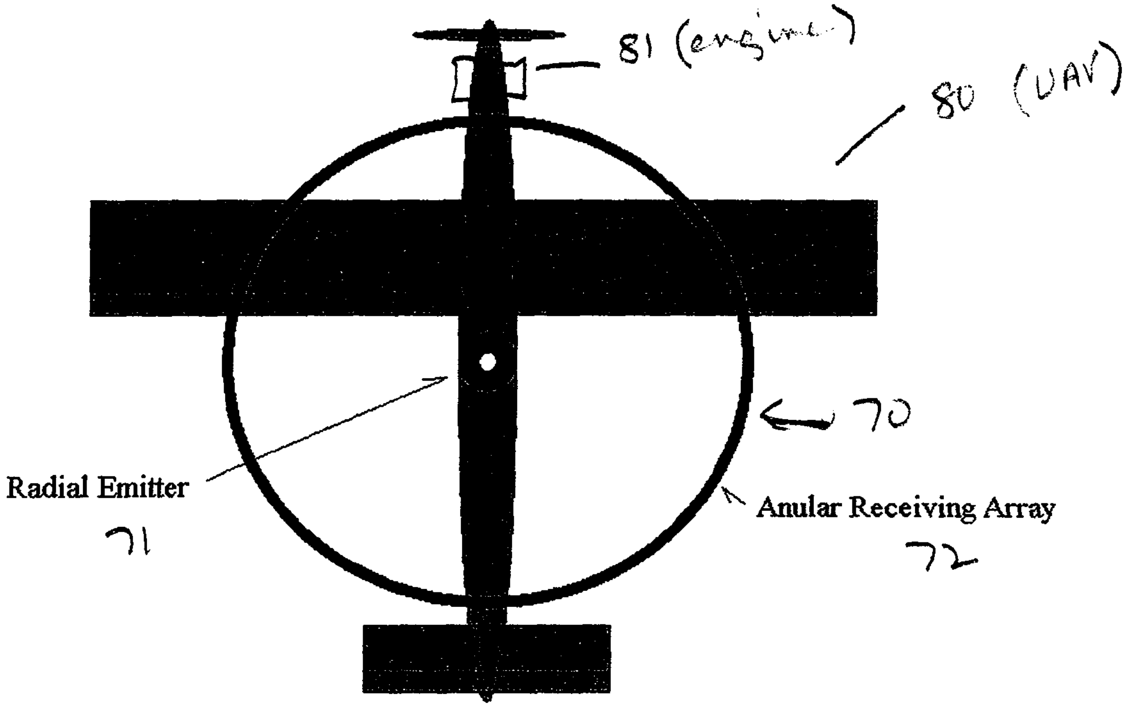
FIG. 8 illustrates the microphone of FIG. 7 installed on an airborne vehicle.

FIG. 8 illustrates how the microphone array 70 of FIGS. 7A and 7B can be positioned above or below a UAV 80. Because the circular array 70 is positioned wholly behind the engine 81, only the paths originating from the tail looking forward through the propeller would be affected by engine noise. Excellent coverage could still be had to the rear and sides of the aircraft.

The cross section of the array, radial emitter, and all support struts could be made with an appropriate airfoil shape to minimize drag and wind induced high frequency noise. Laboratory experiments have shown that good parametric modulation is obtained with an interaction length as little as 50 cm (about 1-½ feet). Thus, assembly of a suitable airborne microphone array could be accomplished on an aircraft of modest size.

What is claimed is:

1. A microphone for detecting sound and for reducing noise that interferes with the sound, comprising:
- microphone circuitry for detecting the desired sounds;
- wherein the microphone circuitry comprises at least one emitter for generating a high frequency acoustic field, such that the high frequency acoustic field is mixed with the sound, thereby providing a mixed signal having a high frequency acoustic carrier and the sound as sideband signals, and at least one receiver positioned relative to the emitter such that it receives the mixed signal;
- wherein the emitter and the receiver are spaced and opposed at opposite ends of a straight acoustic path;
- wherein the at least one receiver has an aperture less than several wavelengths of the high frequency acoustic field; and
- wherein the emitter and receiver are spaced to reinforce reflected interaction of the high frequency and sound signals between them.

2. The microphone of claim 1, wherein the high frequency is an ultrasonic frequency.

3. The microphone of claim 1, wherein each emitter and each receiver is an emitter-receiver transducer.

4. The microphone of claim 1, further comprising a demodulator for extracting the desired sound signal from the mixed signal.

5. The microphone of claim 1, wherein the emitter emits radially.

6. A microphone for detecting sound and for reducing noise that interferes with the sound, comprising:
- microphone circuitry for detecting the desired sounds;
- wherein the microphone circuitry comprises at least one transducer for generating a high frequency acoustic field, such that the high frequency acoustic field is mixed with the sound, thereby providing a mixed signal having a high frequency acoustic carrier and the sound as sideband signals, and at least one reflector positioned relative to the emitter such that it reflects the high frequency acoustic field back to the transducer;
- wherein the reflector is not located at source of the sound;
- wherein the emitter and the receiver are spaced and opposed at opposite ends of a straight acoustic path; and
- wherein the transducer and reflector are spaced to reinforce a standing wave between them.

7. The microphone of claim 6, wherein the high frequency is an ultrasonic frequency.

8. The microphone of claim 6, further comprising a demodulator for receiving the mixed signal from the transducer and for extracting the desired sound signal from the mixed signal.

* * * * *